United States Patent [19]

Delpla et al.

[11] Patent Number: 4,819,867
[45] Date of Patent: Apr. 11, 1989

[54] THERMOSTATIC MIXING VALVE

[75] Inventors: Claude A. Delpla; Henri D. Limet, both of Reims; Francois P. Janicaud, Jonchery S/VESLE, all of France

[73] Assignee: Compagnie Internationale Des Produits Sanitaires "CIPS", Paris, France

[21] Appl. No.: 246,573

[22] Filed: Sep. 19, 1988

[30] Foreign Application Priority Data

Jan. 11, 1988 [FR] France .................. 88 00204

[51] Int. Cl.⁴ ............................................. G05D 23/13
[52] U.S. Cl. ................... 236/12.16; 236/12.23
[58] Field of Search ............... 236/12.16, 12.17, 12.23, 236/12.1

[56] References Cited

U.S. PATENT DOCUMENTS

| 3,433,264 | 3/1969 | Parkison | 137/625.17 |
| 3,929,283 | 12/1975 | Delpla | 236/12 R |
| 4,674,678 | 6/1987 | Knebel et al. | 236/12.12 |
| 4,693,415 | 9/1987 | Sturm | 236/12.12 |

FOREIGN PATENT DOCUMENTS

| 238674 | 1/1986 | European Pat. Off. . |
| 230800 | 11/1986 | European Pat. Off. . |
| 2804803 | 2/1978 | Fed. Rep. of Germany . |
| 2250934 | 11/1973 | France . |
| 2494387 | 10/1981 | France . |
| 2491578 | 10/1981 | France . |
| 2592127 | 12/1985 | France . |
| 2586782 | 6/1986 | France . |
| 2089003 | 10/1981 | United Kingdom . |

Primary Examiner—William E. Tapolcai
Attorney, Agent, or Firm—Quarles & Brady

[57] ABSTRACT

A thermostatic mixing valve is provided in which the temperature of the mixture for a median position of a control lever is regulated to a chosen value. The mobile plate which moves opposite a fixed plate through which the two flows are admitted forms part of a mobile regulation case containing a thermostatic regulation element controlling a differential closure element mounted for regulating the temperature of the mixture in the regulation case.

11 Claims, 4 Drawing Sheets

FIG. 8
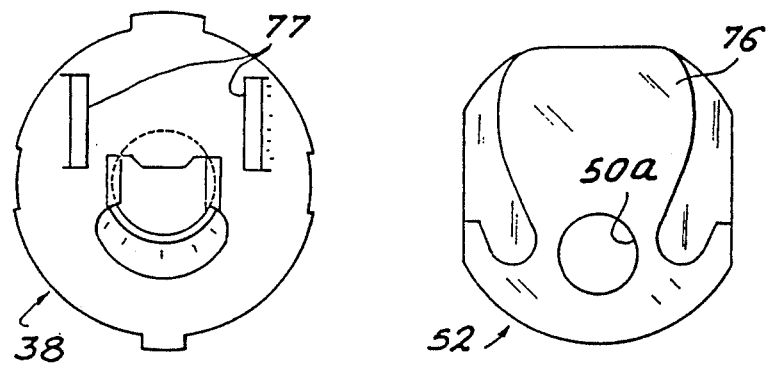
FIG. 7
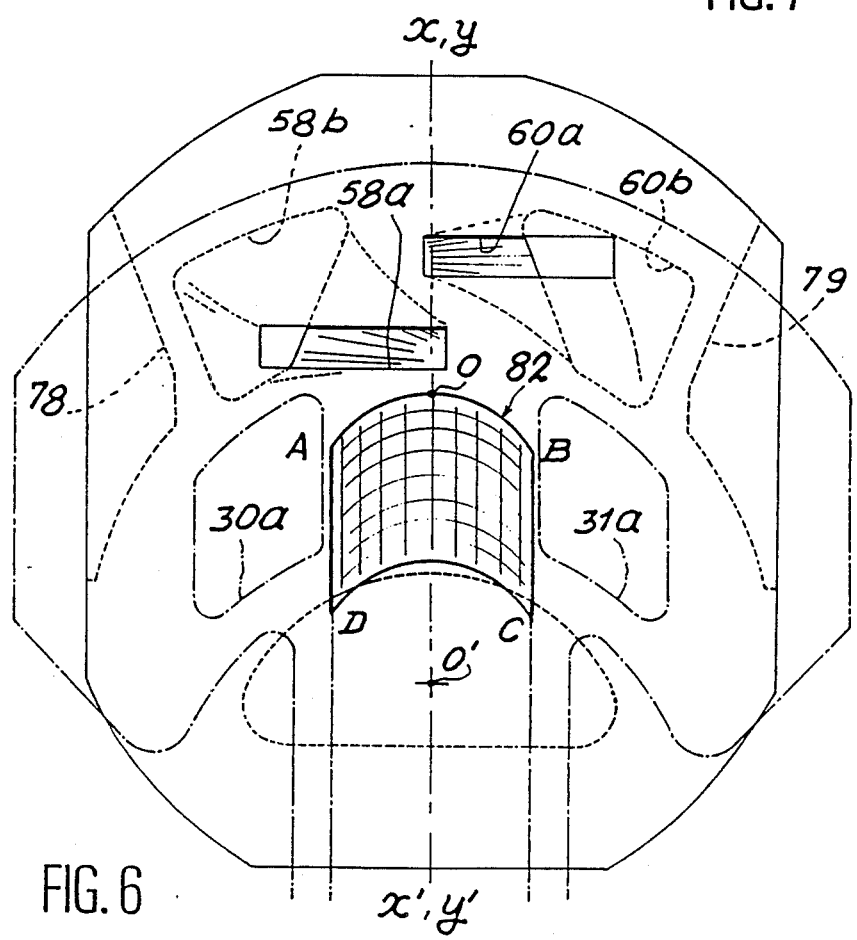
FIG. 6

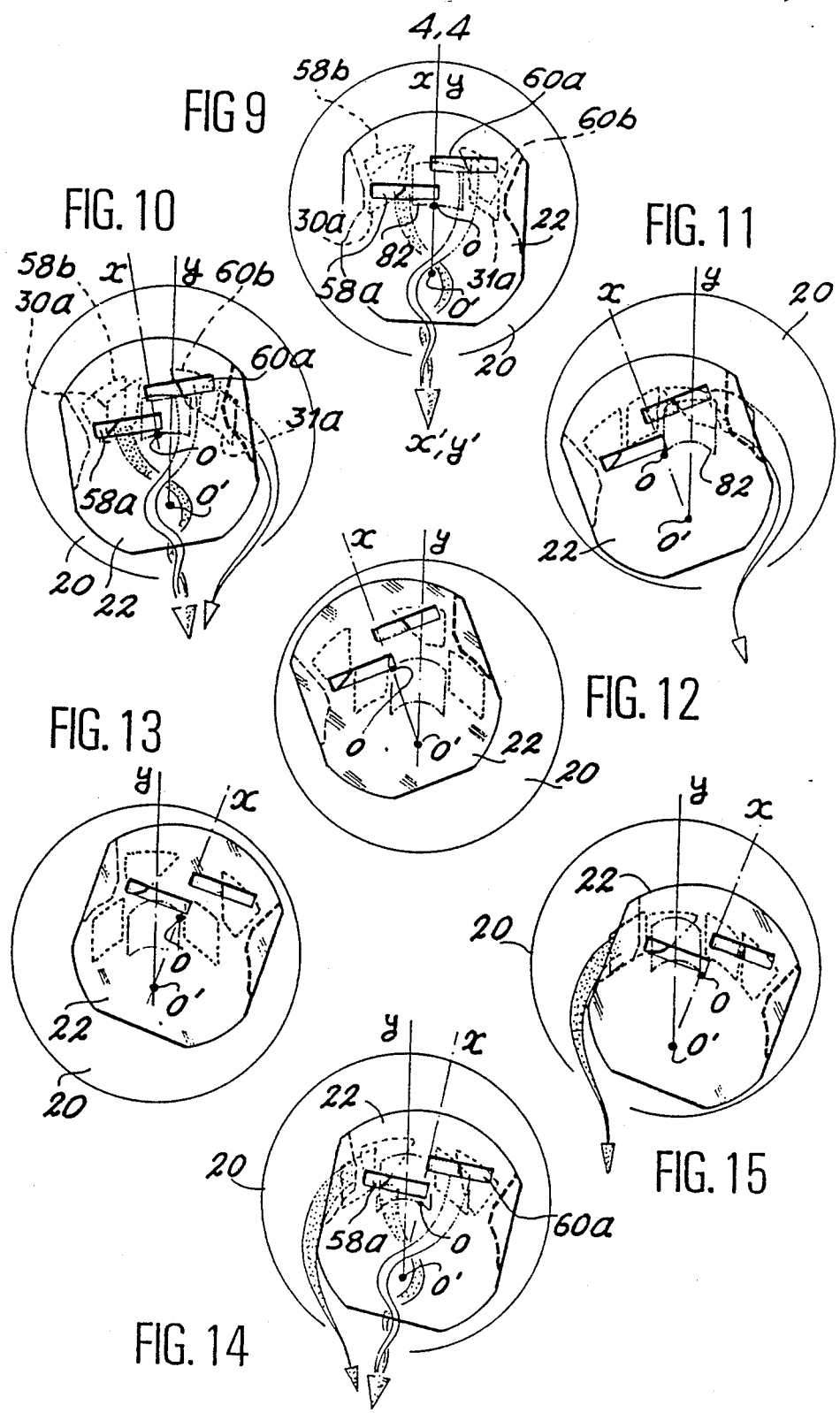

THERMOSTATIC MIXING VALVE

This application claims the benefit of French Application No. 88-00204, filed Jan. 11, 1988.

BACKGROUND OF THE INVENTION

The invention relates to a thermostatic mixing valve for mixing two flows and more particularly in the sanitary field for mixing hot water and cold water. The invention relates more precisely to the adaptation of automatic thermostatic regulation to a valve of a particular type, where the regulation of the flows is achieved by the relative movement of two plates, generally made from ceramics, by means of a single pivoting lever for regulating both the total flow of the mixture and its temperature. By automatic thermostatic regulation is meant the automatic adjustment of the temperature of the mixture to a predetermined value for the median position of the pivoting lever.

Mixing valves with ceramic (sintered aluminium oxide) plates are known, also called "mirrors" because of their smooth surfaces by which they are in mutual contact. The plates comprise passages and/or characteristics of form for regulating both the rate and the mixture of the two flows. In the field of sanitary taps and fittings, these devices are more and more widely used for mixing hot water and cold water. By way of example, the French patent application No. 2,592,127 describes such a ceramic plate mixing valve controlled by a single pivoting lever of the ball lever type and having as main advantage a real independence of the two types of regulation. In other words, the temperature of the mixture is not modified when the lever is actuated vertically for adjusting the flowrate, and conversely, this flowrate does not vary when the temperature of the mixture is changed by moving the same lever horizontally. However, the temperature corresponding to the median position of the lever depends essentially on the respective temperatures and pressures of the hot water and cold water sources. Depending on the case, the range of use of the regulating lever may then be offset towards one end of the travel of the control lever and make the temperature regulation more difficult.

Conventional sanitary plumbing installations are further known, i.e. having separate regulation means for the hot water and the cold water, incorporating a thermostatic element, known per se, and adapted for providing automatic regulation of the mean temperature of the mixture. This mean temperature is thus predetermined and regulated through the thermostatic regulation element. Such a thermostatic regulation element is for example formed of a metal capsule with telescopic structure, filled with wax capable of expanding, expanding of the wax results in a variable elongation of the capsule in a predetermined longitudinal direction. An installation of this kind is described for example in the French Pat. No. 2,250,934.

The invention consists in combining a thermostatic regulation arrangement incorporating such a regulation element with a smooth plate mixing valve, particularly with ceramic plates, of the above described kind.

SUMMARY OF THE INVENTION

To this end, the invention relates to a thermostatic mixing valve for mixing two flows at different temperatures, of the type comprising a body containing two plates having two respective flat and smooth faces, in sliding contact against each other, one fixed plate immobilized in said body having orifices respectively in communication with inlet pipes for the two flows and a mobile plate coupled to a ball lever for the combined control of the flow rate and the temperature of said mixture, said mobile plate being adapted so as to close said orifices of said fixed plate in a variable way and an outlet for said mixture being formed in the wall of a main mixing chamber defined in said body, in which valve said mobile plate forms a part of a mobile regulation case adapted for movement in said main mixing chamber under the action of said ball lever, this case defining an auxiliary mixing chamber in communication with said main mixing chamber, said mobile plate comprises two through passages providing respectively communication between each of the orifices of said fixed plate and said secondary mixing chamber and this latter contains a thermostatic regulation element, known per se, coupled to an arrangement for the variable closure of the orifices of the two through passages situated in said secondary mixing chamber.

BRIEF DESCRIPTION OF THE DRAWINGS

The invention will be better understood and other advantages thereof will be clear from the following description of a presently preferred embodiment of a thermostatic mixing valve conforming to its principle, given solely by way of example and with reference to the accompanying drawings in which:

FIG. 6 shows the fixed plate and the mobile plate in a relative position corresponding to closure of the valve with the lever in the median position and showing the forms of the different contours and orifices of these plates;

FIG. 7 is a view of the upper face of the regulation case;

FIG. 8 is a detail view of one of the parts of the valve for guiding the regulation case; and FIGS. 9 to 15 are views similar to FIG. 6 on a smaller scale and showing the two plates in characteristic relative positions.

DESCRIPTION OF THE PREFERRED EMBODIMENTS.

Figure 2:
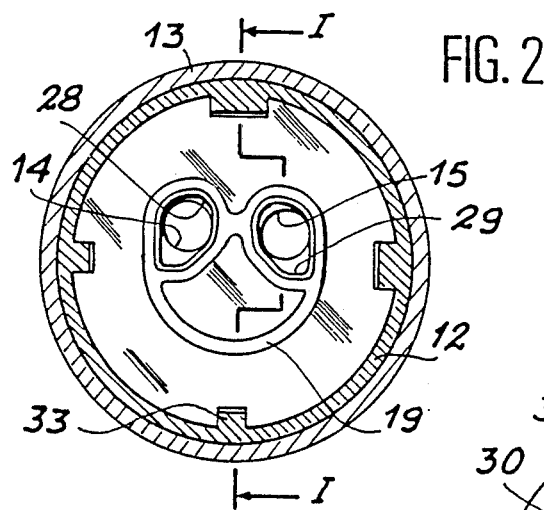
FIG. 2 is a section through II—II of FIG. 1.
Figure 3:
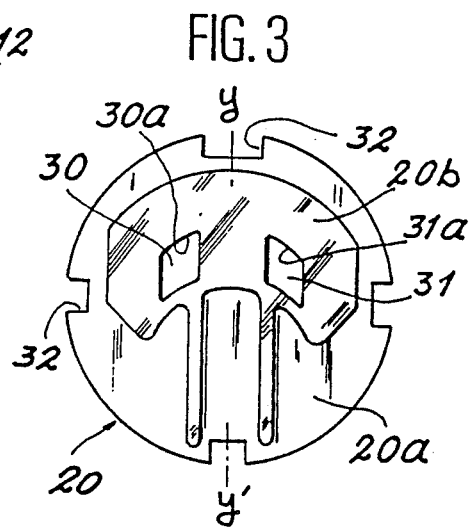
FIG. 3 is a detail view of the sliding surface of the fixed plate.

Referring to the drawings, a thermostatic mixing valve 11 is shown having a body 12, for example made from a molded plastic material for insertion in a corresponding cavity of a tap 13. Two pipes 14 and 15 are connected to the lower part of the tap for the intake of the hot water and the cold water respectively. A stud 16 cooperating with a blind hole 17 in the tap provides correct positioning of body 12 thereinside. Body 12, having a general approximately cylindrical shape, has its lower face resting on the bottom of the tap through an elastomer seal 18 housed in an external groove of the body, for separating the hot water and cold water flows, and for providing overall sealing between the body and the tap. A seal 19 (see FIG. 2) of the same form as seal 18 is housed in a similar groove in the bottom wall of body 12. A fixed plate 20 rests on this seal which thus provides the same sealing and flow separation functions between the body and the fixed plate. The form of seals 18 and 19 further provides a good "seat" between the base of the tap, the body 12 and the fixed plate 20. Seal 19 further provides constant adhesion between the fixed plate 20 and a mobile plate 22, said fixed plate being urged against the mobile plate by partial and controlled crushing of the seal when body 12 is immobilized in the housing of the tap by a ring 23, a threaded portion 23a of which cooperates with an internal corresponding tapping formed in the upper part of tap 13. Body 12 comprises an outlet 25 in its side wall, positioned opposite the spout 26 of the tap. The bottom of body 12 has two passages 28, 29 (FIG. 2) extending respectively pipes 14 and 15, and surrounded by two seals 18 and 19. The fixed plate 20, preferably made from ceramics, also has two passages 30, 31 communicating respectively with the passages 28, 29 in said body and consequently with pipes 14, 15, respectively. The fixed plate is immobilized at the bottom of said body in a correct position through notches 32 (FIG. 3) which cooperate with studs 33 (FIG. 2) integrally molded with body 12.

In its upper part, the valve body 12 comprises a ball lever 35 having a ball joint 35a, this latter being housed in a cavity 37 comprising a spherical portion of the same diameter and thereover a frustro-conical portion forming a stop. This cavity is defined partially by a cover 36 of the body and partially by a guide piece 38 (which will be described in detail further on) whose lower face is generally parallel to the fixed plate 20. Sealing at the level of the ball lever is provided at the interface between cover 36 and the guide piece 38, by means of a four lobe seal 39, called "quadriny", this seal being housed in a groove in said cover. The latter further comprises integrally molded flexible hooks cooperating with housings formed in the sidewall of body 12. The cover and the body are assembled together by simple axial fitting. Sealing between cover 36 and the threaded ring 23 is provided by an 0 seal 40 housed in an internal groove of ring 23. Sealing between ring 23 and tap 13 is provided by an 0 seal 41 housed in an external groove of ring 23, above its threaded portion 23a. The upper frustro-conical portion of cavity 37 opens into a guide groove 44, defined in cover 36 and so fixed with respect to body 12. This groove is open at its upper part so that the ball lever 35 may project outside said body. The accessible end of this lever is fixed to an operating element 45, itself formed as a lever for imparting to said ball lever 35 not only a pivoting movement along groove 44, but also a rotational movement about its own axis 46. The amount of rotation about axis 46 is predetermined and identical for any position of lever 35 in groove 44. This amount of rotation is determined by a double stop 47 in the form of a cam of ball lever 35 which cooperates with the sides of groove 44. Ring 23 comprises another threaded section 48 on which is screwed a decorative cap 49, preferably made from the same material as tap 13. An upper recess in this cap, whence the ball lever 35 emerges, is masked by the operating element 45. Fitting of the ball lever is very comparable to that described in the French patent application No. 2,592,127. Such fitting provides a constant amplitude of the temperature regulation range (corresponding to rotation of the ball lever about its axis 46), whatever the flowrate fixed by the position of ball lever 35 in groove 44. The ball lever 35 comprises an eccentric projection 50 coupled to the mobile plate 22. The latter is adapted for variably closing the upper orifices 30a, 31a of passages 30, 31 of the fixed plate, namely the orifices defined at the interface of the fixed plate and the mobile plate.

Figure 4:
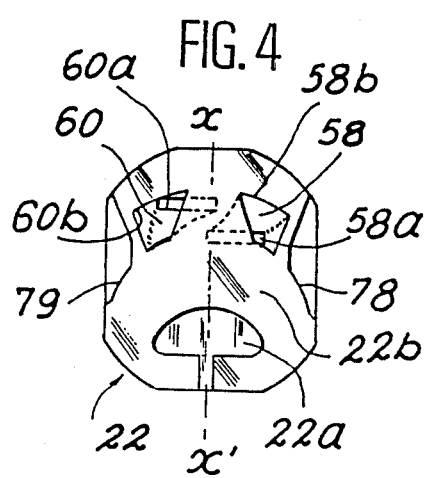
FIG. 4 is a detail view showing the mobile plate and more particularly the sliding surface thereof which is in contact with the fixed plate.

According to an important feature of the invention, the mobile plate 22 forms a part (the lower wall) of a mobile regulation case 52 adapted for moving inside a main mixing chamber 53 defined in body 12 between the fixed plate 20 and said guide piece 38. The outlet 25 communicates with said main mixing chamber 53. The regulation case 52 has, on its upper face (i.e. the face parallel to the mobile plate 22) a blind cavity 50a in which the excentric projection 50 is engaged. This connection of form provides the coupling between said excentric projection 50 and the mobile plate 22, via the whole of the regulation case 52. Plates 20 and 22 have zones 20a, 22a which are recessed with respect to the contact faces 20b, 22b (see FIGS. 3 and 4) for limiting the operating force.

Figure 1:
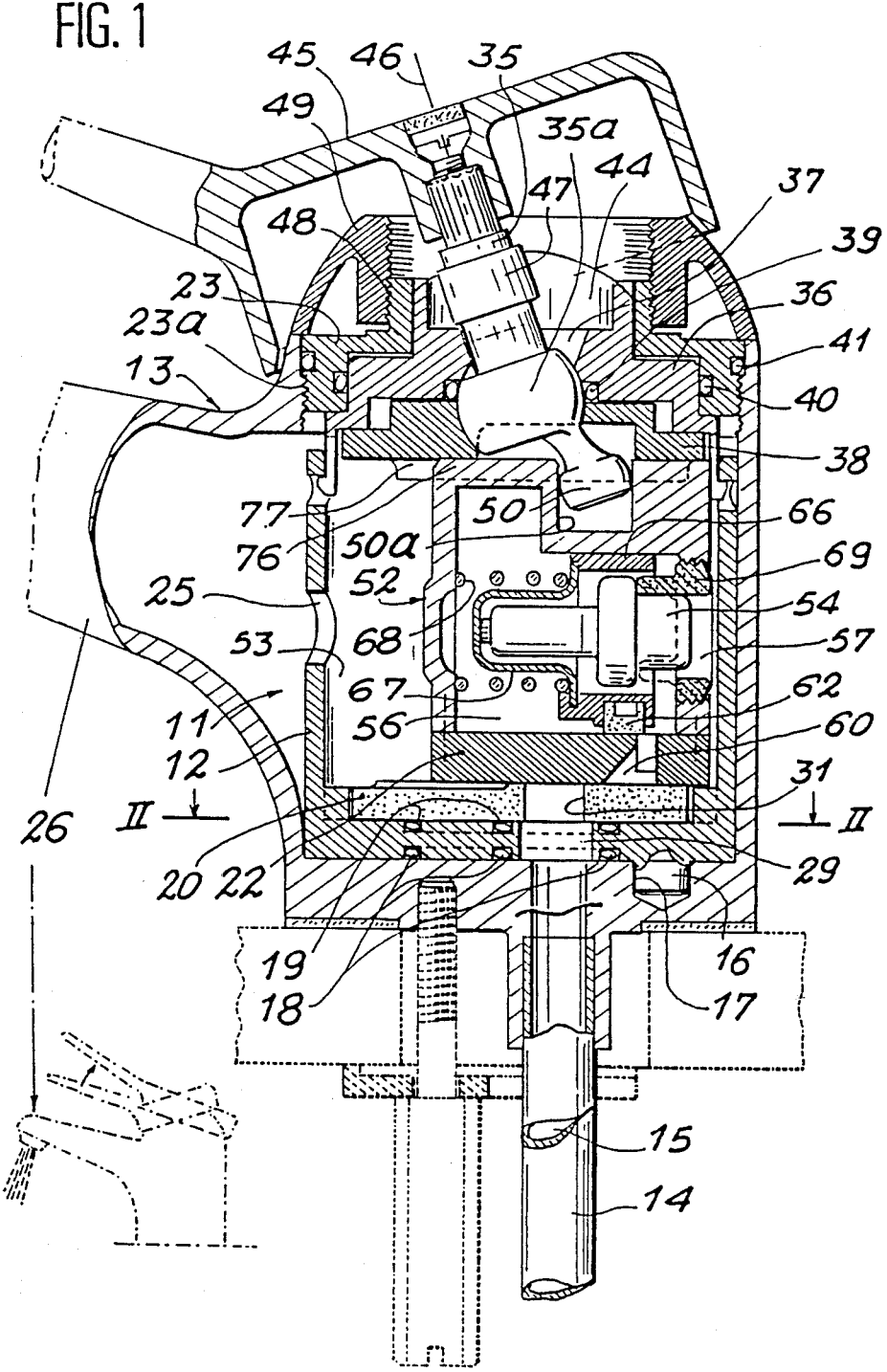
FIG. 1 is an elevational view of the thermostatic mixing valve shown in section through I—I of FIG. 2.

As is clear from FIG. 1, the guide piece 38, cover 36 and the threaded ring 23 have shoulders in contact with each other and therefore defining an assembly which is clamped by screwing ring 23 in tap 13. Screwing of ring 23 also conditions, through case 52, the partial crushing of seals 18 and 19, a functional clearance between the fixed plate and the body permitting controlled compression of the seal 19. The regulation case 52 contains a thermostatic regulation element 54, known per se, whose description is given hereafter. The elongate cartridge of this element 54 is adapted for expanding along its longitudinal axis, i.e. here horizontally in case 52. The latter defines a secondary mixing chamber 56 communicating with the main mixing chamber through an opening 57. Furthermore, the mobile plate 22 comprises two through passages 58, 60 respectively for the hot water and for the cold water, which are adapted for providing respectively communication between orifices 30a, 31a (FIG. 3) of the fixed plate and the secondary mixing chamber 56. In the latter, the thermostatic regulation element 54 is coupled to an arrangement providing variable closure of orifices 58a and 60a (FIG. 4) of the two through passage 58, 60, situated in the secondary mixing chamber 56. This closure arrangement comprises in particular a differential closure element 62 (see FIG. 5) in contact with a flat face 63 of the mobile plate, on chamber 56 side. This closure element 62 moves between the two orifices 58a and 60a depending on the length variation of said thermostatic regulation element 54. It is supported by a mobile plate coupled for movement to the thermostatic regulation element 54. More precisely, this mobile assembly comprises a rectangular frame 66 extended by a metal cup 67. The frame supports the closure element 62 at its lower part and is caused to move in chamber 56 in a direction parallel to the axis of symmetry x'x of the face of the mobile plate 22 which is in contact with the fixed plate. Of course, the thermostatic regulation element 54 is oriented so that this direction of movement of the mobile assembly 66, 67 is also the direction in which it expands or retracts. The thermostatic element 54 further extends through frame 66 and one of its ends bears against cup 67. On the other side of the latter, a spring 68 is mounted between the internal wall of the regulation case 52 and the mobile assembly. This spring, situated in the extension of the thermostatic regulation element 54 therefore maintains this latter applied against the mobile assembly. The thermostatic regulation element 54 bears, through a shoulder on its case, under the urging of spring 68 against a stop 69 of the regulation case. This stop is formed of a threaded portion screwed in a tapped hole in the regulation case and three fingers extending the threaded portion, on which the shoulder of the thermostatic regulation element bears. Two small elastomer cylinders 70 are disposed between frame 66 and the differential closure element 62 so as to maintain this latter applied resiliently against the face 63 of the mobile plate 22.

Figure 5:
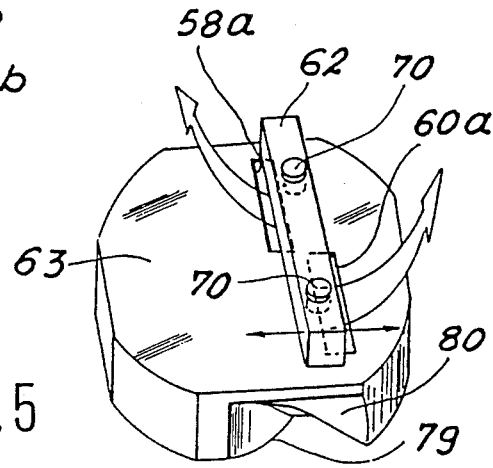
FIG. 5 is a detail view showing the mobile plate in perspective with an element causing differential closure of the orifices of this mobile plate.

As shown more clearly in FIG. 5, the surface of the closure element 62 in contact with the face 63 of the mobile plate has the shape of an elongate rectangle whose large dimension is oriented perpendicularly to the axis of symmetry x'x, whereas the orifices 58a and 60a on chamber 56 side, of the two passages 58, 60 also have the form of two elongate rectangles parallel to the closure element 62 but offset with respect to each other in a direction parallel to the axis of symmetry x'x. The closure element 62, here in the form of a square section bar, is placed, as shown, between the two offset rectangular grooves and it will be readily understood that expansion of the regulation element 54 results in a reduction of the uncovered area of orifice 58a and a corresponding increase in the uncovered area of orifice 60a. This results in a regulation of the temperature of the mixture inside the secondary mixing chamber 56. The mean temperature desired may be adjusted by positioning stop 69.

Furthermore, the movement of the regulation case 52 in the main mixing chamber 53 under the action of the ball lever 35 follows trajectories conditioned by the shape of the lower face of the guide piece 38 and by that of the upper portion of the regulation case 52. More precisely, this latter has a boss 76 at least partially substantially cylindrical, defined in the vicinity of cavity 50a (FIG. 7) and caused to move in a guide groove 77 which is fixed with respect to body 12. This guide groove is defined on the internal face of the guide piece 38 (FIG. 8). This groove thus defines a direction of movement of boss 76 parallel to an axis of symmetry y'y of the face of the fixed plate 20, against which said mobile plate 22 is caused to slide. The orifices 30a, 31A situated on this face of the fixed plate which contains the axis of symmetry y'y each have approximately the form of a parallelogram whose two parallel sides are oriented parallel to this axis of symmetry. Furthermore, the orifices 58b, 60b of the through passage 58, 60 situated on the fixed plate side and cooperating respectively with orifices 30a, 31a each have approximately the form of a right angle trapezium, the right angles of this trapezium being furthest away from the axis of symmetry x'x.

Finally, the contour of the face of the mobile plate in contact with the fixed plate comprises two re-entrant indentations 78, 79 (symmetrical with respect to the axis x'x) capable respectively of variably uncovering the orifices 30a, 31a in the fixed plate. For certain positions of the fixed plate and the mobile plate a certain proportion of hot water and cold water may then be fed into the main mixing chamber 53. In the example described, these re-entrant indentations each have successively a rectilinear portion substantially parallel to a neighboring side of the trapezium shaped orifice 30a, 30b, a rectilinear portion substantially parallel to the axis of symmetry x'x and a convex curved portion. Furthermore, each indentation 78, 79 is extended by a corbelling hollow 80 formed in the thickness of the mobile plate and providing an even and silent flow of the hot water and cold water.

The relative shapes and positions of the orifices and the indentations in the fixed plate and the mobile plate have been determined for a large part experimentally and cannot therefore be described in greater detail. However, they are shown accurately and to scale in FIG. 6. The forms and dimensions of the orifices and indentations, such as shown in FIG. 6, are therefore characteristic of a presently preferred embodiment of the invention. They depend for a large part on the movement kinematics of the regulation case 52, defined by the ball lever 35, the guide piece 38, the guide groove 44 in cover 36 and the stop formed by the frustro-conical portion of cavity 37. A modification of the forms and dimensions of this lever and of this guide piece would cause a modification of the forms and dimensions of the openings and indentations. These different forms and dimensions of the orifices and indentations whose definitions are within the grasp of a man skilled in the art knowing the invention, would nevertheless fall within the scope of this latter.

The operation of the mixing valve which has just been described will now be explained with reference to FIGS. 6 and 9 to 15. In these figures, the above described orifices and indentations are shown as well as the axes of symmetry x'x and y'y of the contacting faces of the mobile plate and the fixed plate respectively. Furthermore, the fictitious contour 82 defines the border of the area which the end of projection 50 (its geometrical center) may occupy, considered in projection on the interface plane of plates 20 and 22. In other words, the contour 82 itself corresponds to at least one (rotational or pivotal) end position of the ball lever 35 and represents as it were the locus of all its end positions. Point 0 defines the position of the offcentered projection 50 of the ball lever (or, which amounts to the same thing, the center of cavity 5a) whereas 0' represents the position of the center of boss 76, still in projection on the interface plane of the plates. As was explained above, point 0' moves along the axis y'y.

In the position shown in FIG. 6, the valve is completely closed with the ball lever 35 immobilized in the median position. Orifices 30a and 31a are completely closed by the mobile plate. Point 0 is situated in the middle of the arc AB of contour 82. If lever 35 is rotated about its own axis, the mobile plate moves so that point 0 moves over the arc AB. The valve remains closed as long as point 0 remains on the arc AB. The two end positions are illustrated by FIGS. 12 and 13 and it can be seen that the path of the mobile plate is then such that the orifices 30a or 31a are never uncovered either by an orifice 58b or 60b or an indentation 78 or 79. For all the closed positions of the valve, the secondary mixing chamber is not supplied. On the other hand, by causing lever 35 to pivot in groove 44 (i.e. when point 0 penetrates inside the area 82), orifices 58b, 60b and/or the indentations 78, 79 will uncover orifices 30a, 31a in a variable way.

If we assume for example that the lever has thus been caused to pivot while maintaining it in the middle of its rotational travel, as illustrated in FIG. 6, point 0 will move along axis y'y in area 82. The flowrate increases progressively as orifices 58b and 60b uncover the orifices 30a and 31a. All the flow passes through the secondary mixing chamber 56 and the temperature regulation is provided through expansion of the thermostatic regulation element 54, by appropriate positioning of the differential closure element 62 opposite the rectangular orifices 58a, 60a. The temperature is thus established at a chosen value (e.g. 37°) for any position of the lever in groove 44 (but in the absence of rotation about axis 46), whatever the flowrate. Maximum flowrate at medium temperature may thus be obtained, where point 0 is in the middle of the arc CD of area 82. This is the situation illustrated in FIG. 9. The arc CD corresponds to all the maximum flowrate positions. If lever 35 is rotated in the "colder water" direction, for example from the maximum flow position illustrated in FIG. 9, the desired temperature change will occur in the main mixing chamber 53 by provision of cold water caused by the cooperation of indentation 79 and orifice 31a, the latter being uncovered more and more by said indentation. At the same time, the hot water and cold water flows in chamber 56 decrease following a simultaneous reduction of the communication between, on the one hand, groove 30a and 58b and, on the other, orifices 31 and 60b (see FIG. 10) until these four orifices are respectively totally disjoined (FIG. 11). In this latter situation (point 0 is at D), the flow of the thermostatted water mixture from the secondary mixing chamber 56 is completely cut off and the temperature of the water at the outlet of the valve is that of the cold water source.

On the contrary, if lever 35 is rotated in the "hotter water" direction, still from the position of maximum flow shown in FIG. 9, we pass successively through the situation illustrated in FIG. 14 where a certain increase in proportion of hot water is mixed in chamber 53 with the mixed water leaving chamber 56 until the cold water and hot water intakes into the secondary mixing chamber 56 are completely cut off as illustrated in FIG. 15. In this latter position (where point 0 is at C), the temperature of the water at the outlet of the valve is that of the hot water source.

What is claimed is:

1. A thermostatic mixing valve for mixing two flows at different temperatures, of the type comprising a body containing two plates having two respective flat and smooth faces, in sliding contact against each other, one fixed plate immobilized in said body having two orifices respectively in communication with inlet pipes for the two flows and a mobile plate coupled to a ball lever for the combined control of the flow rate and the temperature of said mixture, said mobile plate being adapted so as to close said orifices of said fixed plate in a variable way and an outlet for said mixture being formed in the wall of a main mixing chamber defined in said body, in which valve said mobile plate forms a part of a mobile regulation case adapted for movement in said main mixing chamber under the action of said ball lever, this case defining an auxiliary mixing chamber in communication with said main mixing chamber, said mobile plate comprises two through passages providing respectively communication between each of the orifices of said fixed plate and said auxiliary mixing chamber; and said auxiliary mixing chamber has a thermostatic regulation element coupled to an arrangement for the variable closure of the orifices of the two through passages situated in said auxiliary mixing chamber.

2. The mixing valve as claimed in claim 1, wherein said thermostatic regulation element is oriented so that its axis of expansion is parallel to an axis of symmetry of the face of said mobile plate in contact with said fixed plate, said variable closure arrangement comprising a mobile assembly coupled to said thermostatic regulation element and capable of movement in the direction of said axis of symmetry, said mobile assembly having a differential closure element in contact with a flat face of said mobile plate and moving between the orifices of the two through passages, as a function of the variation of length of said thermostatic regulation element.

3. The mixing valve as claimed in claim 2, wherein the contour of the face of the mobile plate in contact with the fixed plate comprises two re-entrant indentations adapted for variably uncovering the orifices of said fixed plate.

4. The mixing valve as claimed in claim 3, wherein the surface of said closure element in contact with said mobile plate has the form of an elongate rectangle whose largest dimension is oriented perpendicularly to said axis of symmetry and the orifices of the two through passages on the secondary mixing chamber side have the form of two elongate rectangles parallel to said differential closure element and offset with respect to each other.

5. The mixing valve as claimed in claim 1, wherein said mobile assembly is held applied against one end of said thermostatic regulation element by a spring, itself bearing against the internal wall of the regulation case and said thermostatic regulation element bears, under the urging of said spring, against an adjustable stop of said regulation case.

6. The mixing valve as claimed in claim 1, wherein the ball lever is caused to move in a predetermined pivoting direction defined by a guide groove which is fixed with respect to said body, with the possibility of a predetermined amount of rotation about its axis for all positions along said pivoting direction, the two end rotational positions being predetermined by at least one stop of the lever cooperating with the edges of said guide groove and this lever comprises a projection engaged in a cavity of the regulation case, opening outwardly thereof in a face opposite said mobile plate.

7. The mixing valve as claimed in claim 6, wherein, on said cavity side, said regulation case is formed with a boss at least partially substantially cylindrical and caused to move in a guide groove fixed with respect to said body and defining a direction of movement of said boss parallel to an axis of symmetry of the face of said fixed plate against which said mobile plate is caused to slide.

8. The mixing valve as claimed in claim 7, wherein the orifices of said fixed plate defined in its face in contact with said mobile plate each have approximately the shape of a parallelogram whose two parallel sides are oriented parallel to said axis of symmetry of this face.

9. The mixing valve as claimed in claim 8, wherein the orifices of the through passages of said mobile plate, on said fixed plate side, each have approximately the form of a right angle trapezium.

10. The mixing valve as claimed in claim 9, wherein the re-entrant indentations provided on the contour of said face of the mobile plate in contact with said fixed plate each have successively a rectilinear portion substantially parallel to a neighboring side of the trapezium shaped orifice, a rectilinear portion substantially parallel to said axis of symmetry of said face of the mobile plate and a convex curved portion.

11. The mixing valve as claimed in claim 10, wherein each indentation is extended by a corbelling hollow formed in the thickness of said mobile plate.

* * * * *